United States Patent [19]

Zarchy

[11] Patent Number: 5,639,957

[45] Date of Patent: Jun. 17, 1997

[54] METHOD AND APPARATUS FOR PERFORMING MODAL MASS ANALYSIS OF EXHAUST GAS FROM MOTOR VEHICLE

[75] Inventor: Richard R. Zarchy, Crystal Lake, Ill.

[73] Assignee: Snap-on Technologies, Inc., Lincolnshire, Ill.

[21] Appl. No.: 542,064

[22] Filed: Oct. 12, 1995

[51] Int. Cl.$^6$ .................................................. G01N 1/22
[52] U.S. Cl. ................................. 73/23.31; 73/117.2
[58] Field of Search .............................. 73/23.31, 23.32, 73/116, 117, 117.2, 117.3, 118.1; 60/273, 276

[56] References Cited

U.S. PATENT DOCUMENTS

| | | |
|---|---|---|
| 3,999,425 | 12/1976 | Collin . |
| 4,328,546 | 5/1982 | Kreft et al. . |
| 4,348,732 | 9/1982 | Kreft . |
| 4,586,367 | 5/1986 | Lewis . |
| 4,602,127 | 7/1986 | Neely et al. . |
| 4,727,746 | 3/1988 | Mikasa et al. . |
| 4,853,850 | 8/1989 | Krass, Jr. et al. . |
| 5,099,680 | 3/1992 | Fournier et al. . |
| 5,105,651 | 4/1992 | Gutmann . |
| 5,129,257 | 7/1992 | Carduner et al. . |
| 5,184,501 | 2/1993 | Lewis et al. . |
| 5,218,857 | 6/1993 | Decker et al. . |
| 5,287,283 | 2/1994 | Musa . |
| 5,337,595 | 8/1994 | Lewis . |
| 5,383,126 | 1/1995 | Ogawa et al. . |
| 5,419,178 | 5/1995 | Decker et al. .............. 73/23.31 |

*Primary Examiner*—Richard Chilcot
*Assistant Examiner*—Eric S. McCall
*Attorney, Agent, or Firm*—Emrich & Dithmar

[57] ABSTRACT

A method and apparatus for measuring the quantity of an ingredient gas in the exhaust gas from a motor vehicle with a known engine displacement during a time period in which the vehicle is driven over varying driving modes (modal mass analysis). The resultant measurement is achieved without use of a constant volume sampling device by first measuring and storing data $C_E(t)$ representative of the concentration of the ingredient gas in the exhaust gas at successive time intervals during the period. The vehicle speed during each successive time interval is measured and stored, followed by calculating theoretical exhaust flow rate values $Q_{Et}(t)$, representative of the flow rate of the exhaust gas for each of the succession of time intervals, based on the known engine displacement and the measured engine speed. Then approximate actual exhaust flow rate values $Q_{Ea}(t)$ are calculated using a polynomial curve fit method on the calculated theoretical flow rate values $Q_{Et}(t)$. Lastly, the quantity M(t) of the ingredient gas in the exhaust gas for each of the succession of time intervals is determined on the basis of the operational equation $$M(t)=\rho \times C_E(t) \times Q_{Ea}(t),$$

where $\rho$ is the density of the ingredient gas.

14 Claims, 1 Drawing Sheet

METHOD AND APPARATUS FOR PERFORMING MODAL MASS ANALYSIS OF EXHAUST GAS FROM MOTOR VEHICLE

BACKGROUND OF THE INVENTION

1. Field of the Invention

The present invention relates to a method and apparatus for performing modal mass analysis of an exhaust gas from a motor vehicle subjected to varying driving modes during a mass emissions test.

2. Description of the Prior Art

Many countries require the certification of motor vehicles, especially with respect to engine emissions. Many of the prescribed certification processes require a so-called CVS (constant-volume sampling) dilution system for performing a modal mass analysis. In a CVS-based modal mass analysis procedure, a sample is taken from a predetermined quantity of gas, composed of engine exhaust and ambient air. The ratio between the exhaust gas and air changes continually because the driving cycle involves different driving modes, such as acceleration, deceleration, etc. of the vehicle. Each driving mode results in different exhaust-gas/air ratios.

A method of modal mass analysis of an exhaust gas from a motor vehicle utilizing a CVS for calculation of flow values QE(t), during a mass emissions test, is disclosed in U.S. Pat. No. 4,727,746, to Mikasa, et al. Until now, the basic steps for performing a modal mass analysis of the exhaust gas has involved:

(a) connecting the vehicle under test to a dynamometer in a conventional manner in order to control vehicle load (i.e., subject the vehicle's engine while in gear to acceleration, deceleration, cruise speed conditions, etc.) and attaching some means to read vehicle speed/distance;

(b) connecting a CVS system to the vehicle's exhaust to establish a constant flow rate;

(c) further connecting a concentration analyzer to the vehicle exhaust to measure concentration levels of a specified ingredient gas CE(t) in real time; and (d) coupling an engine analyzer to the engine, the dynamometer, the CVS system and to the concentration analyzer—the engine analyzer controls the dynamometer to visually guide the driver through the transient test, and computes mass emission levels on the basis of the measured flow rate values QE(t) and concentration levels CE(t) from the CVS and the concentration analyzer, respectively.

Exhaust flow values are critical in calculating mass emission levels in a modal mass analysis. Equally important are the concentration levels of ingredient gases, such as CO, $CO_2$, $NO_x$, HC and the like, determined at specified intervals over the sampling period. The Mikasa et al. patent discloses the well-known relationship that the quantity (mass) of any particular ingredient gas in the exhaust gas is determined for each driving mode by the use of the following operational equation:

$$M(t) = \rho \times C_E(t) \times Q_E(t), \quad \text{eq. (1)}$$

where $\rho$ is the density of the ingredient gas, CE(t) is the concentration level of the ingredient gas at time (t), and QE(t) is the flow rate of the exhaust gas at some time (t).

Theoretically, the exhaust flow rate is a function of engine displacement and engine speed and expressed by:

$$\text{FLOW-theo}(Q_{Ei}) = \text{displacement} \times (1/1728) \times (RPM/60), \quad \text{eq. (2)}$$

where the expression (1/1728) converts the cubic inch displacement into a cubic foot displacement, and the expression (RPM/60) converts revolutions per minute into revolutions per second, to yield consistent flow rate parameters. Unfortunately, the theoretical flow calculation differs drastically from the actual flow. There having been, until now, no recognizable linear or non-linear relationship between the theoretical and actual flows over varying driving conditions. Under some driving conditions, there may be as much as a 30–50%, or more, difference between theoretical and actual flow values.

Given recently required improvements in the performance of motor vehicles in view of governmental regulations of exhaust gas emissions, test requirements have become more stringent. As a result, all stations must now use an expensive CVS device or the functional equivalent thereof to conduct emissions testing. A CVS typically works by creating a flow that is higher than the exhaust flow on any car (typically 750 CFM). The exhaust flow passes through an orifice of a venturi, creating a differential pressure which is measured, over a sampling period, with two pressure transducers. On the basis of the measured differential pressure values and the relative dimensions of the CVS, such as the diameter of the orifice and the CVS throat diameter, an exhaust flow rate can be calculated, using text book formulas, which is within a few percentage points of actual flow.

However, given the critical dimensioning in design and the cost of component materials necessary for construction of a CVS, such devices are extremely expensive and non-cost-effective for use with decentralized type test sites, such as in states which allow vehicle owners to have their vehicle inspected at a local, authorized, privately-owned repair station, as opposed to a centralized government test facility.

It would be a great advancement in the art of mass emissions testing to be able to determine mass quantity of a gas without the use of a CVS.

SUMMARY OF THE INVENTION

It is a general object of the invention to provide a method and apparatus for determining the actual flow rate of an exhaust gas from a motor vehicle without use of a CVS.

It is a further object of the present invention to provide a method and apparatus for determining the actual flow rate of an exhaust gas for any specific interval of a transient test period, by measuring the engine speed of the motor vehicle during the relevant time interval and, on the basis of the known engine displacement, calculating the flow rate using a polynomial curve fit method.

It is yet another object of the invention to provide a method and apparatus for determining the mass quantity of an ingredient gas of the exhaust gas using the calculated actual flow rate values, calculated in the manner disclosed by the present invention, and using gas concentration values measured with a concentration analyzer.

These and other features of the present invention are attained by providing a method and apparatus for determining flow rate of the exhaust gas from a motor vehicle with a known engine displacement. This is achieved by measuring and storing the engine speed, calculating a theoretical exhaust flow rate value $Q_{Ei}$, representative of the theoretical flow rate of the exhaust gas, based on the known engine displacement and the measured engine speed, and calculating an approximate actual exhaust flow rate value $Q_{Ea}$ on the basis of a known polynomial curve expression relating to the stored theoretical flow rate value $Q_{Ei}$.

Furthermore, there is also provided a method and apparatus for measuring the quantity of an ingredient gas in the exhaust gas from a motor vehicle with a known engine displacement during a time period in which the vehicle is driven over varying driving modes. This is achieved by first measuring and storing data $C_E(t)$ representative of the concentration of the ingredient gas in the exhaust gas at successive time intervals during the period. The vehicle speed during each successive time interval is also measured and stored. Theoretical exhaust flow rate values $Q_{Ei}(t)$, representative of the flow rate of the exhaust gas for each of the succession of time intervals, based on the known engine displacement and the measured engine speed, are subsequently calculated. Then the approximate actual exhaust flow rate values $Q_{Ea}(t)$ are calculated on the basis of a polynomial curve expression relating to the stored theoretical flow rate values $Q_{Ei}(t)$. Lastly, the quantity $M(t)$ of the ingredient gas in the exhaust gas for each of the succession of time intervals is determined on the basis of the operational equation $$M(t) = \rho \times C_E(t) \times Q_{Ea}(t),$$

where $\rho$ is the density of the ingredient gas.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENTS

Figure 1:
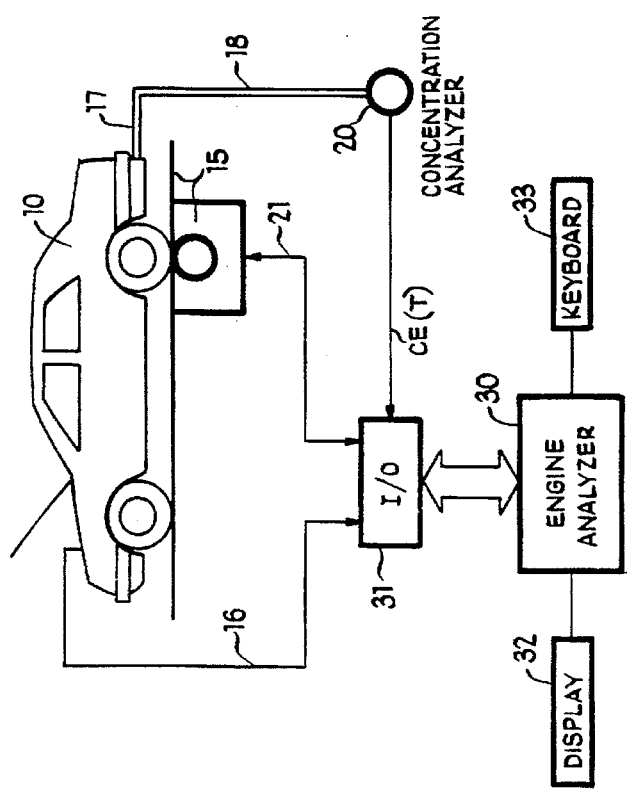
FIG. 1 is a diagrammatic illustration of a modal mass analysis system, using a dehydrator and a concentrations analyzer coupled to an engine analyzer, for determining mass emissions levels of the vehicle under test.

Referring to FIG. 1, there is illustrated a modal mass analysis system for use on a motor vehicle 10, coupled in a known manner to a chassis dynamometer 15 which is operable to simulate various driving conditions of the engine of the motor vehicle 10, as if it were being driven on an actual road. The engine of the vehicle 10 is controlled by a driver seated in the vehicle who will variably accelerate, decelerate and maintain cruising speeds, in an appointed sequence over a predefined and continuous driving period (usually a 240-second test period). During this driving period, the dynamometer 15 permits the vehicle wheels to be rotated in engagement with a surface while the vehicle is standing still, permitting the test to be conducted in a technician's shop.

A pickup cable 16 relates information on actual engine speed to an engine analyzer 30 via an I/O port 31 thereof. The engine analyzer 30 is equipped with an appropriate display 32 and may also include additional peripheral resources (not shown), such as printers and external memory, coupled thereto. Operator input commands and test parameters (such as information on the vehicle's engine displacement fed to the analyzer 30 via a keyboard 33) and measured parameters such as outside temperature and barometric pressure, are stored in appropriate memory registers.

Reference numeral 17 designates an exhaust-gas-inlet passage for receiving gas exhausted from the vehicle 10 under test. Gas samples are led from the exhaust gas-inlet passage 17 through a sampling passage 18 for measurement of the concentration of each of various ingredient gases ($CO$, $CO_2$, $NO_x$, $HC$ and the like). For this purpose, a concentration analyzer 20 is provided which analyzes the exhaust gas to determine the concentration of each of one or more specified ingredient gases (the ingredient or ingredients to be measured). The measured ingredient gas concentration levels $CE(t)$ are then communicated to the engine analyzer 30 from the concentration analyzer 20, via the I/O port 31, and stored in assigned memory locations, all in a known manner.

The engine analyzer 30 is essentially a microprocessor-based embedded controller system adapted to carry out multiple system functions, including controlling the operation of the dynamometer 15 in a conventional manner by way of a communication link 21 thereto, storing detected engine speed information and gas concentration levels for each of predetermined successive intervals during the period the vehicle 10 is under test, and simultaneously performing an operational treatment to determine the quantity of each specified ingredient gas in the exhaust gas during each of the various driving modes (modal mass analysis), on the basis of a calculation of the flow rate of the exhaust gas, described in detail below. It should be appreciated that the flow rate calculation is based on the finding by the present inventors that there exists a quantifiable, non-linear relationship between theoretical exhaust gas flow ($QEi$) and actual exhaust flow ($QEa$). This relationship is expressed by the following operational equation:

$$Q_{Ea} = \frac{C_1 + (C_2 \times Q_{Ei})}{1 + (Q_{Ei} \times C_3)}, \qquad \text{eq. (3)}$$

where $C_1$ is a constant of value: $1.06764 \times 10^2$ $C_2$ is a constant of value: $3.11868 \times 10^{-1}$, and $C_3$ is a constant of value: $1.24765 \times 10^1$.

Figure 2:
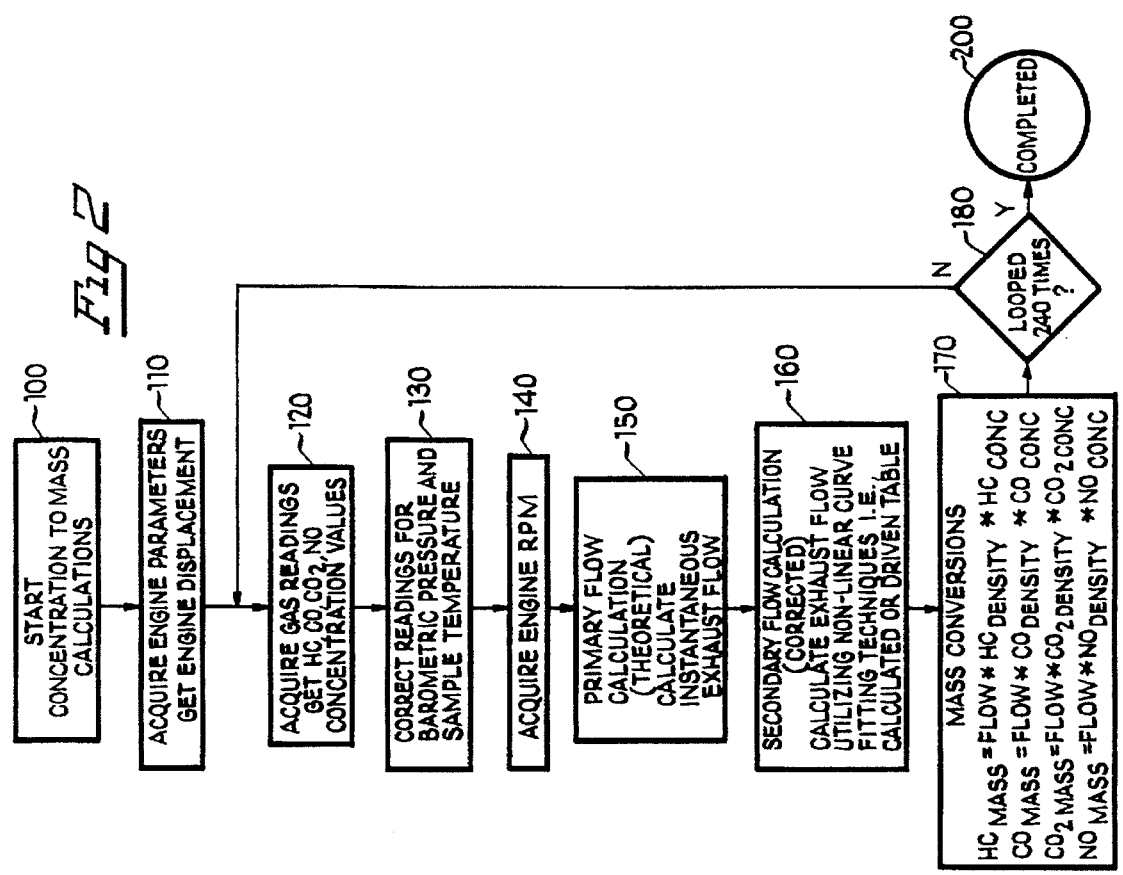
FIG. 2 is an operational flowchart of the method for determining mass emissions levels in accordance with the present invention.

The method for calculating mass emissions levels without use of a CVS will now be generally described with reference to FIG. 2. In the illustrative embodiment, data readings and calculations are taken over a 240-second simulated driving period at successive one-second, sampling time intervals, in accordance with current EPA emissions testing requirements. It should be understood that all measurements are taken over a varying range of driving modes, such as acceleration, cruise and deceleration modes, and that normal mode changing-over time delays, known to affect concentration value measurements, are adjusted in a known manner to achieve real-time results.

After test initialization, which includes properly connecting pickup 16, dynamometer 15, and the exhaust-gas-inlet passage 17 to the vehicle 10, and connecting dynamometer 15 to the engine analyzer 30, the technician seated within the vehicle 10 begins the modal mass analysis test (block 100) via a remote keyboard 33. The technician is prompted by the analyzer 30 to manually enter the engine displacement (block 110) of the vehicle under test if it is different from a default value, or alternatively, to identify the vehicle model, allowing the engine analyzer 30, with the use of a look-up table or the like stored in its non-volatile memory (not shown), to automatically determine the engine's displacement value.

Once the displacement value is determined, the engine analyzer 30 acquires, once each second, the values of specified ingredient gas concentration levels CE(t), as measured by the concentration analyzer 20 and communicated to the engine analyzer 30 (block 120). The measured concentration values are stored by the engine analyzer 30 in memory, and then corrected to compensate for any differences in barometric pressure and sample temperature (block 130), in a known manner.

Substantially simultaneously, the engine's speed for each particular timing interval is measured by the analyzer 30 using the pick-up 16 and the measurements per interval is stored in appropriate assigned memory registers (block 140).

On the basis of the known engine displacement and the measured engine speed for a particular sampling time interval, a theoretical exhaust flow rate (QEi) is calculated by the engine analyzer 30 on the basis of the known equation (2) described above (block 150).

Once the theoretical flow rate (QEi) is determined, the engine analyzer 30, on the basis of the known polynomial curve expression set forth above in equation (3), calculates an approximation of the actual flow rate (QEa). This is achieved by use of software routines which perform the calculation of equation 3, or alternatively, by an appropriate look-up table scheme (block 160).

Lastly, using the stored concentration values CE(t) (corrected for differences in temperature and pressure) for each ingredient gas ($HC_{con}$, $CO_{con}$, $CO_{2con}$, $NO_{con}$, etc.), the known density ($\rho$) value of each of the ingredient gases ($HC_{den}$, $CO_{den}$, $CO_{2den}$, $NO_{den}$, etc.), and the calculated actual exhaust flow rate (QEa), approximate mass emission levels (M(t)) for each of the ingredient gases are determined (block 170) by application of the known formulaic expression represented in equation (1) above.

The mass emission-level calculating routine (blocks 120–170) just described is repeated 240 times—once for each second in the 240-second time interval—and appropriate readings and calculations for each interval are stored in memory to be later graphically displayed or printed in a readably useful manner.

Test results have shown that the polynomial-based, non-linearly derived mass emission-level results (M(t)) are within approximately 10% of actual mass emission level values for specified ingredient gases.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A method of determining flow rate of exhaust gas from a motor vehicle with a known engine displacement, the method comprising the steps of:

measuring and storing the engine speed;

calculating a theoretical exhaust flow rate value $Q_{Ei}$, representative of the theoretical flow rate of the exhaust gas, based on the known engine displacement and the measured engine speed; and calculating an approximate actual exhaust flow rate value $Q_{Ea}$ on the basis of a polynomial curve expression relating to the calculated theoretical flow rate value $Q_{Ei}$.

2. The method of claim 1, wherein said polynomial curve expression is defined by the following operational equation:

$$Q_{Ea} = \frac{C_1 + (C_2 \times Q_{Ei})}{1 + (Q_{Ei} \times C_3)},$$

where $C_1$, $C_2$ and $C_3$ are constants.

3. The method of claim 2, wherein $C_1$ is a constant of value $1.06764 \times 10^2$, $C_2$ is a constant of value $3.11868 \times 10^{-1}$, and $C_3$ is a constant of value $1.24765 \times 10^1$.

4. The method of claim 1, wherein said calculated actual flow rate value $Q_{Ea}$ is stored in a memory register.

5. A method of measuring the quantity of an ingredient gas in the exhaust gas from a motor vehicle with a known engine displacement during a time period in which the vehicle is driven over varying driving modes, the method comprising the steps of:

measuring and storing data $C_E(t)$ representative of the concentration of the ingredient gas in the exhaust gas at successive time intervals during said period;

measuring and storing the vehicle engine speed during each said successive time interval;

calculating theoretical exhaust flow rate values $Q_{Ei}(t)$, representative of the flow rate of the exhaust gas for each of the succession of time intervals, based on the known engine displacement and the measured engine speed;

calculating approximate actual exhaust flow rate values $Q_{Ei}(t)$ using a polynomial curve fit method on the calculated theoretical flow rate values $Q_{Ei}(t)$; and determining the quantity M(t) of the ingredient gas in the exhaust gas for each of the succession of time intervals on the basis of the operational equation $$M(t) = \rho \times C_E(t) \times Q_{Ea}(t),$$

where $\rho$ is the density of the ingredient gas.

6. The method of claim 5, wherein said polynomial curve expression is defined by the following operational equation:

$$Q_{Ea}(t) = \frac{C_1 + (C_2 \times Q_{Ei}(t))}{1 + (Q_{Ei}(t) \times C_3)},$$

where $C_1$, $C_2$ and $C_3$ are constants.

7. The method of claim 6, wherein $C_1$ is a constant of value $1.06764 \times 10^2$, $C_2$ is a constant of value $3.11868 \times 10^{-1}$, and $C_3$ is a constant of value $1.24765 \times 10^1$.

8. The method of claim 5, wherein said calculated actual flow rate value $Q_{Ea}$ is stored in a memory register.

9. An apparatus for determining a flow rate of exhaust gas from a motor vehicle with a known engine displacement, the apparatus comprising:

means for measuring and storing the engine speed;

means for calculating a theoretical exhaust flow rate value $Q_{Ei}$, representative of the theoretical flow rate of the exhaust gas, based on the known engine displacement and the measured engine speed; and means for calculating an approximate actual exhaust flow rate value $Q_{Ea}$ on the basis of a polynomial curve expression relating to the calculated theoretical flow rate value $Q_{Ei}$.

10. The apparatus of claim 9, wherein said means for calculating the approximate actual flow value $Q_{Ea}$ includes means for converting the theoretical value $Q_{Ei}$ to the approximate actual value $Q_{Ea}$ on the basis of the following operational equation:

$$Q_{Ea} = \frac{C_1 + (C_2 \times Q_{Ei})}{1 + (Q_{Ei} \times C_3)},$$

where $C_1$, $C_2$ and $C_3$ are constants.

11. The apparatus of claim 10, wherein $C_1$ is a constant of value $1.06764 \times 10^2$, $C_2$ is a constant of value $3.11868 \times 10^{-1}$, and $C_3$ is a constant of value $1.24765 \times 10^1$.

12. An apparatus for determining a quantity of an ingredient gas in the exhaust gas from a motor vehicle with a known engine displacement during a time period in which the vehicle is driven over varying driving modes, the method comprising the steps of:

- means for measuring and storing data $C_E(t)$ representative of the concentration of the ingredient gas in the exhaust gas at successive time intervals during said period;
- means for measuring and storing the vehicle speed during each said successive time interval;
- means for calculating theoretical exhaust flow rate values $Q_{Ei}(t)$, representative of the flow rate of the exhaust gas for each of the succession of time intervals, based on the known engine displacement and the measured engine speed;
- means for calculating approximate actual exhaust flow rate values $Q_{Ea}(t)$ on the basis of a polynomial curve expression relating to the calculated theoretical flow rate values $Q_{Ei}(t)$; and
- means for determining a quantity M(t) of the ingredient gas in the exhaust gas for each of the succession of time intervals on the basis of the operational equation $$M(t) = \rho \times C_E(t) \times Q_{Ea}(t),$$

where $\rho$ is the density of the ingredient gas.

13. The apparatus of claim 12, wherein said means for calculating approximate actual flow value $Q_{Ea}(t)$ includes means for converting theoretical values $Q_{Ei}(t)$ to approximate actual values $Q_{Ea}(t)$ on the basis of the following operational equation:

$$Q_{Ea}(t) = \frac{C_1 + (C_2 \times Q_{Ei}(t))}{1 + (Q_{Ei}(t) \times C_3)},$$

where $C_1$, $C_2$ and $C_3$ are constants.

14. The apparatus of claim 13, wherein $C_1$ is a constant of value $1.06764 \times 10^2$, $C_2$ is a constant of value $3.11868 \times 10^{-1}$, and $C_3$ is a constant of value $1.24765 \times 10^1$.

* * * * *

UNITED STATES PATENT AND TRADEMARK OFFICE
CERTIFICATE OF CORRECTION

PATENT NO. : 5,639,957
DATED : June 17, 1997
INVENTOR(S) : Richard R. Zarchy It is certified that error appears in the above-identified patent and that said Letters Patent is hereby corrected as shown below:

Column 6, line 18, "the" should be --a--;

line 19, "the" should be deleted.

Signed and Sealed this

Thirty-first Day of March, 1998

*Attest:*

BRUCE LEHMAN

*Attesting Officer*      *Commissioner of Patents and Trademarks*